June 28, 1966 M. L. BEST ETAL 3,257,884
SKIN MINCING APPARATUS
Filed Sept. 2, 1964 2 Sheets-Sheet 1

INVENTORS:
MERLE L. BEST
JOSEPH P. JANUSZKA
LEONARD J. LERNER
LOUIS TAMASI
BY
ATTORNEY

United States Patent Office 3,257,884
Patented June 28, 1966

3,257,884
SKIN MINCING APPARATUS
Merle L. Best, Somerset, Joseph P. Januszka, Rahway, Leonard J. Lerner, New Brunswick, and Louis Tamasi, North Brunswick, N.J., assignors, by mesne assignments, to E. R. Squibb & Sons, Inc., New York, N.Y., a corporation of Delaware
Filed Sept. 2, 1964, Ser. No. 394,010
5 Claims. (Cl. 83—132)

Biological research frequently involves studies on homogenized skin samples, for example, in the determination of enzyme activity in skin. In such studies shaven skin samples, usually from experimental animals such as mice, are taken in the form of thin slices and frozen. The frozen slice is then cut into small sections, usually by hand, placed in a Virtis homogenizer or conical glass tissue homogenizer and macerated until a uniform homogenate is obtained. Cutting the skin samples so as to obtain readily homogenizable sections is difficult because the samples are frozen in order to preserve the enzyme activity. It is also difficult to obtain uniform slices and to avoid undue maceration of cells.

It is an object of this invention to provide a skin mincing device which rapidly and efficiently minces frozen skin samples so that a uniform homogenate is readily obtained with a conventional homogenizer in a short period of time.

The new and improved skin mincer of this invention comprises a series of parallel, spaced apart blades mounted in a holder which contains a movable pressure or stripper plate. The plate has an aperture for the cutting blades to pass through and stripper wires or grids between the blades. The stripper is spaced away from the blade holder so that the cutting edges do not extend beyond the plate until pressure is applied to the latter. Spring mounting of the stripper plate on corner placed guide posts permits it to retract for a sufficient distance for the blades to protrude to the extent necessary to perform the cutting function.

The cutting device is mounted by suitable means on a cutting table and has a spring handle or lever for applying pressure to the cutting block. The cutting block is preferably also mounted so as to rotate through a 90° angle. In this manner the blades will make two cuts at right angles providing small squares of sample.

Figures 1, 2:
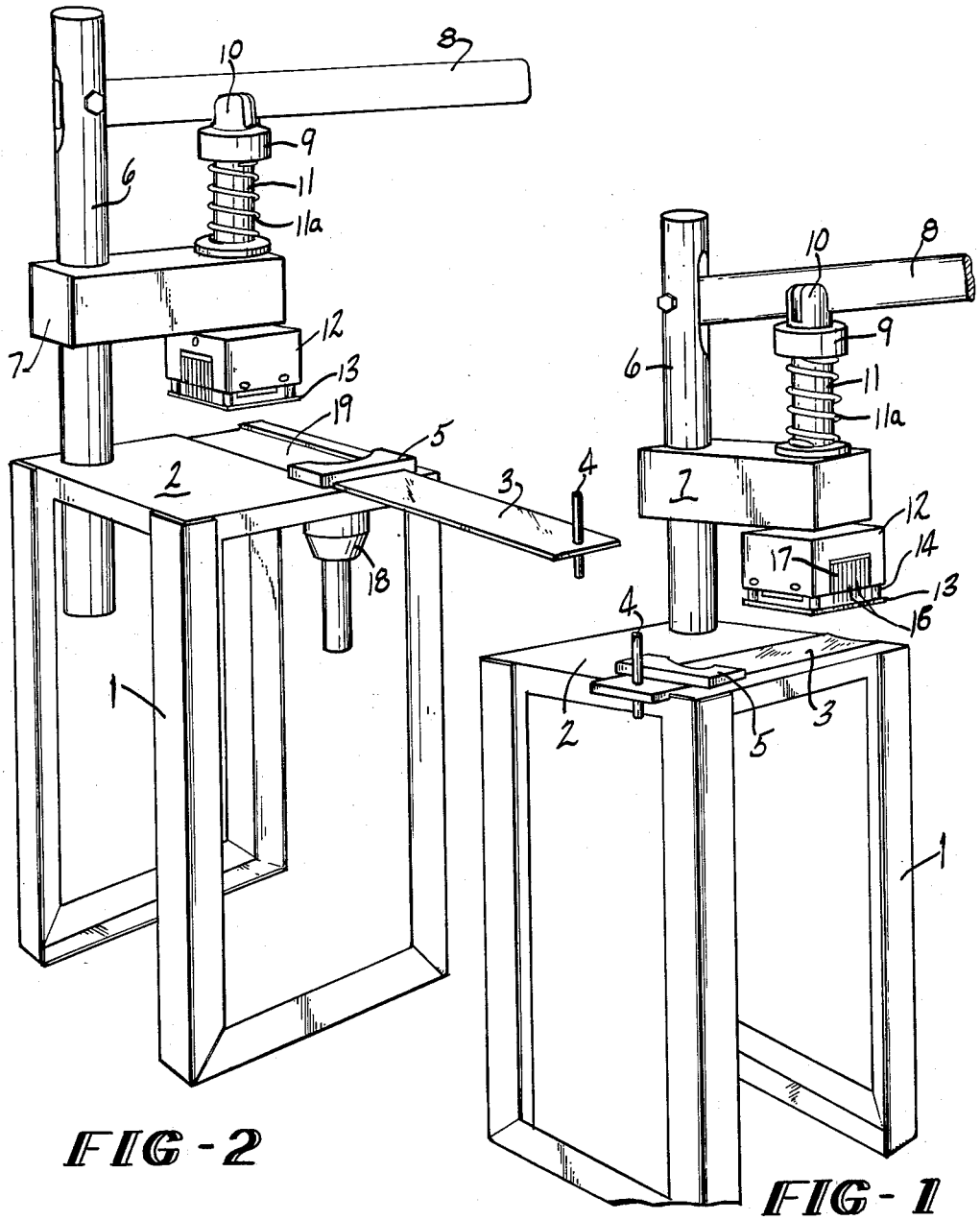
Figure 3:
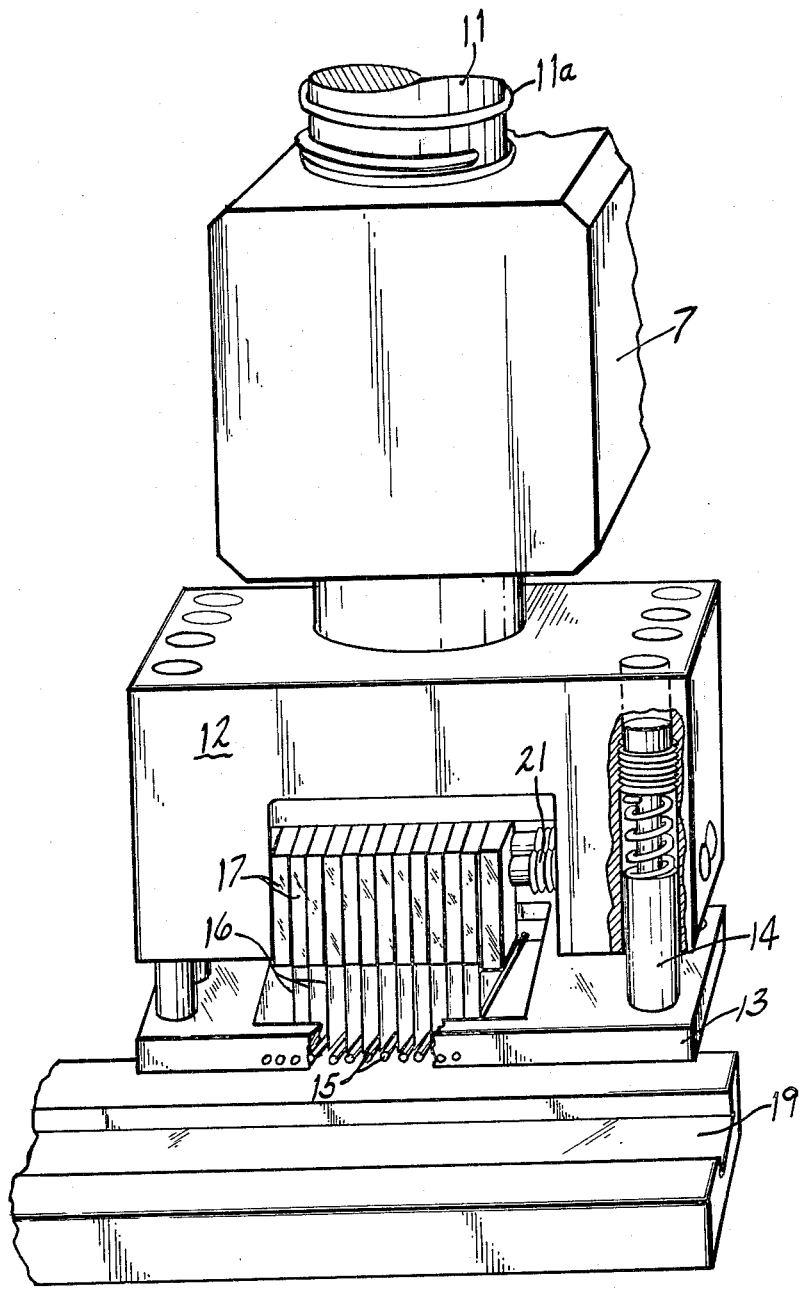

In the drawings which accompany this specification:
FIGURE 1 is a front elevation, partially in perspective.
FIGURE 2 is a side elevation, partially in perspective.
FIGURE 3 is a front view in detail of the cutting head assembly.

Referring to the figures for a more detailed description, a table or work platform 2 is mounted on legs or a frame or base 1. Support post 6 is mounted in frame 1 and serves as the support for the cutting head assembly 12 as well as the operating lever 8.

Cutting head assembly 12 is attached to a slide post 11 which is free to move in a vertical direction and to rotate through an opening in slide post housing 7, except for the restraining action of spring 11a. Spring 11a or a similar restraining means is mounted between support 7 and head 9 to keep the cutting assembly in the upward or rest position. It will be appreciated that other means, such as an air cyclinder, may be used to operate the cutting head assembly.

Slide post 11 is provided with a rotatable head 9 in which there are vertical slots 10 at right angles to each other. Lever or operating handle 8, which is attached to and pivots on post 6, rests in one of the slots 10. The lever is free to be lifted and dropped into the right angle slot when head 9 is rotated through 90°.

It is preferable to provide a cutting surface other than steel or other metal so that the blades are not too rapidly dulled in use by contact with that surface. As can be seen in FIGURE 2, a cutting slide 3 is slidably mounted in recess 19, flush with the surface of table 2 and held in position by wiper and slide clamp 5. The cutting slide is constructed of a tough material, sufficiently hard for the cutting blades to be brought to bear on its surface to achieve a clean cut in the skin samples, yet not so hard as to dull the cutting edges too quickly. A hard plastic material is preferable for this purpose and Teflon [polytetrafluoroethylene, Merck Index, 7th ed., p. 834 (1960)] has in particular been found to be especially suited for this use.

The cutting slide is adapted to slide in a sidewise direction under slide clamp 5 by grasping handle or slide pin 4. According to a preferred modification, an ejection port 20 (not shown) is provided in table 2 within recess 19 and adjacent to slide clamp 5. Thus as cutting slide 3, bearing the cut sections, is drawn sideways, slide clamp 5 wipes the slide clean and the skin samples fall from the slide through the opening into funnel 18 (seen in FIGURE 2). Funnel 18 may be removably attached to the underside of table 2, beneath opening or port 20 by any conventional means, e.g., by means of the funnel lips sliding into a holder attached underneath the opening. A receptacle, such as a conical glass homogenizer tube, may be attached, e.g., by friction fit, to the spout of the funnel 18 to collect the samples as they fall.

In order to facilitate this cleaning operation, the forward end of the cutting slide may be cut in the form of an arc or other geometric form to coincide with the edge of the port 20. Slide clamp 5 may be similarly cut to match the edge of the slide thereby providing complete cleaning of the slide.

The cutting assembly comprises a mount for a plurality of cutting blades, parallel and spaced from each other. As may be seen in FIGURE 3, this may be a recessed support block 12. The removable cutting blades 16, alternating with spacers 17, are fixed in position by clamping screw 21. Any number of blades may be used, but about 10 to 15 spaced about $\frac{1}{16}$ to $\frac{1}{4}$ inch apart have been found to provide good results, the width of the spacer determining the size of the cut.

Stripper plate 13 forms part of the cutting head assembly being spring mounted by guide posts 14 in openings at each corner of the block. A central aperture for the blades to pass through is provided in the plate. It is also desirable to provide stripper wires 15, for example, stainless steel wires welded or otherwise attached to the pressure plate affixed on or near to its lower surface, or some similar means which form a grid through which the cutting blades pass. These tend to hold the skin samples and to clean the blades as they are withdrawn.

In the upward or rest position, the cutting blades are withdrawn into the aperture in the stripper plate just upward of the grid. When the cutting head is lowered and the stripper plate comes to rest on the sample to be cut, the blades pass through the grid by virtue of the spring mounting of the plate 13 and cut through the skin samples until encountering the surface of the slide 3.

In operation, samples of shaven, frozen skin are first taken e.g., with an Osborne arch punch. The resulting skin discs of about $\frac{1}{2}$ inch diameter are then cut into thin uniform slices roughly about $\frac{1}{64}$ inch in thickness, e.g., with a Stadie-Riggs tissue slicer. These are then placed on the cutting slide which is in the closed position under the cutting head assembly. The cutting head is then brought down by pressure on the operating lever. The wire grid of stripper plate 13 first engages the skin sample, holding it firmly in place for action by the cutters.

Additional pressure brings the head down further, the stripper plate guide posts 14 receding in their seats and bearing against their spring mounts.

The cutting blades then pass through the grid and are exposed, cutting the sample cleanly into parallel strips which are approximately equal in width to the space between the blades. The cutting edges come to rest on the surface of the cutting slide after cutting through the frozen skin section. With the release of pressure on the operating lever, spring 11a forces the cutting head assembly back to the rest position. As the blades recede first, the grid clears the sample from the blades and then the whole unit rises, disengaging the plate and grid from the sample which remains on the slide.

After disengaging lever 8 from the slot 10 in which it rests, head 9 is rotated through 90° thereby rotating the cutting head. Lever 8 is replaced in the new slot 10 (normal to the original slot 10) and the operation is repeated. The skin sample is thus cut into small pieces, e.g., each about 1/16 inch square.

The cutting slide is now drawn back by means of slide pin 4 and wiper clamp 5 sweeps the slide clean of the still frozen skin segments which drop through the opening in the table and the spout beneath into the receptacle below funnel 18 provided to collect the samples. With the return of the slide to the closed position, the skin mincer is ready to repeat the operation with an additional sample.

Since it is desirable to keep the skin sample in the hard frozen state in order to obtain as clean a cut as possible and also to preserve the enzyme activity of the skin, it will be appreciated that cooling means, though not essential, may, if desired, be applied to the work platform. This may take the form of cooling lines either attached to the base of the work platform 2 or within the platform itself and adapted to be connected to an external source of circulating refrigerating fluid. A simpler alternative is a removable Dry Ice chamber attached to the underside of the work table immediately below the cutting slide.

The apparatus of this invention permits the rapid segmenting of skin samples into small pieces which are easily handled by the homogenizer and yielding a uniform homogenate in about 30 seconds.

What is claimed is:

1. A skin sample mincing apparatus which comprises a base, a table on said base, a cutting slide slidably mounted in a recess in said table, a vertically disposed post rigidly affixed to said table, a vertically movable rod rotatably attached to said post by support means and disposed over said cutting slide, a cutting head assembly mounted at the lower end of said movable rod, said cutting head assembly comprising a recessed mounting block, a plurality of parallel spaced apart cutting blades in said recess, a stripper plate containing an aperture for said blades spring mounted on said block, spaced apart from the lower face of said block and adapted to expose the cutting blades as pressure forces said plate into contact with said block, spring means between the support means for the movable rod and head therefor holding the cutting head assembly in the upward position, a vertically movable lever pivoted on said post, and slots in the cutting head rod at right angles to each other and adapted to provide a seat for said lever.

2. An apparatus as in claim 1 wherein the aperture in the stripper plate contains stripping means spaced between the cutting blades.

3. A skin sample mincing device which comprises a frame, a table on said frame, a cutting slide slidably mounted in a recess in said table and flush with the surface of said table, a handle therefor, an opening in said table communicating with the space below it, a vertically disposed support post on said table, a horizontal housing affixed to said support post in which is mounted a vertically movable rotatable slide post, said post being maintained in position by spring means between said bar and a head for said post, a cutting head assembly mounted on said slide post below said horizontal housing, said cutting head assembly comprising a mounting block with a plurality of parallel, spaced apart cutting blades mounted in a recess therein and extending below said block, a stripper plate containing an aperture for said blades spring mounted on said block and parallel stripper wires in said aperture spaced between the cutting blades, said stripper plate being spaced apart from said block and adapted to expose the cutting blades as pressure forces said plate into contact with the block, a vertically movable lever pivoted on said support post and slots in the head of said slide post at right angles to each other and adapted to provide a seat for said lever.

4. An apparatus as in claim 3, wherein a funnel is attached beneath the table in communication with the opening therein.

5. An apparatus as in claim 3 wherein the forward end of the cutting slide conforms to the shape of the opening in the table.

References Cited by the Examiner
UNITED STATES PATENTS

| | | | |
|---|---|---|---|
| 25,770 | 10/1859 | Spencer | 83—620 X |
| 2,926,712 | 3/1960 | Lindauer | 146—160 |

ANDREW R. JUHASZ, *Primary Examiner.*